Patented Aug. 22, 1950

2,519,719

UNITED STATES PATENT OFFICE 2,519,719

CATALYTIC PROCESSES FOR PRODUCING STYRENES AND THE LIKE FROM DIARYL PARAFFINS

Murray G. Sturrock and Thomas Lawe, Montreal, Quebec, Canada, assignors to Dominion Tar & Chemical Company Limited, Montreal, Quebec, Canada No Drawing. Application May 19, 1947, Serial No. 749,078

8 Claims. (Cl. 260—668)

This invention relates to the production of aromatic compounds having at least one aliphatic nuclear substituent containing carbon-to-carbon double bond, such compounds optionally containing other substituents, such as one or more of the following: chloro, methyl, ethyl, etc.

The patent to Murray Gray Sturrock and Thomas Lawe, No. 2,373,982, discloses the production of styrenes from paraffins having at least two carbon atoms in the paraffin chain and having two aryl substituents attached to one of said carbon atoms by subjecting such paraffins to a catalyst which promotes simple molecular decompositions at a temperature of at least 350° C. The present invention relates to an improvement in the processes described and claimed in that patent.

An object of the present invention is to reduce the amount of catalyst previously employed in processes such as those described in the aforementioned patent.

Another object of this invention is to reduce the amount of the hydrogenated compound generally produced along with the corresponding styrene.

A further object of this invention is to provide processes wherein the rate of conversion is maintained over a long period instead of dropping off as in the case of many catalysts previously employed.

Still another object of this invention is to provide a catalyst for use in the manufacture of styrenes by the processes described above, which do not become fouled as readily as the materials previously employed.

These and other objects are attained by contacting a substance of the class consisting of paraffins having at least two carbon atoms in the paraffin chain and having two aryl substituents attached to the same carbon atom of the paraffin chain with a siliceous catalyst which promotes simple molecular decomposition (e. g. a hydrated aluminum silicate) in the form of fine particles, as for example, those which are at least small enough to pass through an 80-mesh screen and which are in the form of a coating on a substantially non-porous carrier at a temperature of at least 350° C. It is preferable that the contact time be less than 0.4 second while it is generally desirable to employ contact time of 0.004 second or more. The carrier may be granular or in the form of rings, cylinders, saddles, helices, grids, etc. The carrier should be relatively non-porous so that the catalyst particles will be on the exterior surface of the carrier, rather than absorbed in the carrier. It has been found that the amount of catalyst applied to the carrier should be sufficient to completely cover the exterior surface of the carrier with about one layer of particles in order to convert as much of the diaryl substituted paraffin as possible. In order to avoid having the catalyst foul and in order to minimize the production of alkyl benzenes corresponding to the styrenes being produced, the catalyst coating should be less than about 1 mm. and preferably no thicker than the calculated average thickness of a coating having 3 layers of catalyst particles. In general, we have found that the coating should preferably be between 0.01 mm. and 1 mm. in thickness.

In accordance with our invention, we have found that with 1000 parts by weight of kaolin as a catalyst for the conversion of di-(m-xylyl) ethane a conversion of about 80% is obtained whereas under the same conditions only 100 parts by weight of kaolin when coated onto corundum particles of 4–8 mesh give the same conversion. In other words, it is possible to use one-tenth of the amount of kaolin for the same conversion by using the present invention.

The following examples, in which the proportions are in part by weight, except where otherwise indicated, are given by way of illustration, and not in limitation.

Preparation of catalyst 20 parts of tabular corundum of 4–8 mesh are mixed with 20 parts of kaolin (80 mesh) and 0.4 part of sodium silicate. To this about 25 parts of water are added, and the whole is mixed. The slurry is decanted, and the mixture tray-dried. When dried, the catalyst is baked for about one hour at elevated temperature, such as, for example, at 600° C. The resulting catalyst is screened to remove loose dust, and the proportion of kaolin catalyst picked up by the carrier may be determined by weighing.

If for example, the carrier has picked up 4 parts of kaolin, then the thickness of the coating may be calculated in accordance with the following:

Assuming cubic shape for each particle of corundum with an edge length of 0.4 cm. (from the size of the screens used), the area per particle would be about 0.9 sq. cm. By mechanical count, the number of particles in 20 grams of the corundum used is about 302. Accordingly, the total area in 20 grams is about 290 sq. cm.

In the specification and claims we have assumed that the apparent density of kaolin is about 0.55. All calculations of the thickness of coatings have been made in the following manner using this value. Since 4 grams of kaolin are picked up for 20 grams of the corundum, this is equivalent to a volume of 7.27 cc. Assuming a uniform deposit, the thickness of the coating would be 7.27 divided by 290, equal to 0.025 cm. or in other words, 0.25 mm.

In order to prepare catalysts having a thicker coating of kaolin, the amount of kaolin used is increased, while to produce thinner coatings, the amount of kaolin is decreased. If extremely thin coatings are desired, it has been found that the method of preparation is desirably varied somewhat in that the kaolin is dispersed in a relatively large volume of water and applied to the carrier as a thin dispersion.

*Example 1*

A catalyst prepared in accordance with the foregoing procedure and having about 397 parts of kaolin on 2230 parts of corundum is packed in a converter tube through which about 5843 parts of di-(m-xylyl) ethane vapor, together with 8650 parts of water vapor, are passed at a temperature of about 525° C. for a period of about 25 minutes. The contact time is calculated to be 0.057 second and the calculated thickness of the catalyst coating is 0.2 mm.

During the conversion there is a pyrolysis loss of 1.4%. The condensed oil is distilled in a stripping still at about 30 mm. of mercury absolute pressure, whereby about 3850 parts of light oil are obtained. During the stripping operation, about 1860 parts of the unreacted di-xylyl ethane are recovered. 3843 parts of the light oil are fractionated by charging to the fractionating column that amount of light oil, along with 1000 parts of diphenyl and 20 parts of toluquinone. The fractionation is carried out at 30 mm. of mercury. The fractionation shows that the light oil contains approximately 1674 parts of m-xylene, 39 parts of ethyl-xylene, 2030 parts of dimethyl styrene and 100 parts of loss. About 94.4% of the theoretical yield of m-xylene is obtained along with a yield of 91.8% of the theoretical yield of 2,4-dimethyl styrene. The ethyl xylene-dimethyl styrene fraction contains about 1.9% of ethyl xylene.

*Example 2*

The foregoing example is repeated in substantially all respects except that 1815 parts of kaolin in the form of cubical pellets about 2 mm. on a side are substituted. In this case, the following results are obtained:

Per cent of theoretical yield of m-xylene__ 95
Per cent of theoretical yield of 2,4-dimethyl styrene _____ 85.5
Per cent of ethyl xylene in ethyl xylene-dimethyl styrene fraction_____ 3.4

From a comparison of these results with those obtained in accordance with Example 1, it can readily be seen that the yield of dimethyl styrene decreases, but what is more important, the undesirable ethyl xylene almost doubles.

*Example 3*

Example 1 is repeated in substantially all respects except that a catalyst is used having 458 parts of kaolin coated onto 2080 parts of corundum. The calculated thickness of the coating is then about 0.25 mm. The following results are obtained:

Per cent of theoretical yield of m-xylene__ 93.3
Per cent of theoretical yield of 2,4-dimethyl styrene _____ 90.0
Per cent of ethyl xylene in ethyl xylene-dimethyl styrene fraction_____ 1.6

*Example 4*

Example 1 is repeated in substantially all respects, but a catalyst is used having 352 parts of kaolin coated on about 2150 parts of silicon carbide (4-8 mesh). In this case, the calculated thickness of the coating is 0.18 mm. The following results are obtained:

Per cent of theoretical yield of m-xylene__ 82.5
Per cent of theoretical yield of 2,4-dimethyl styrene _____ 89.5
Per cent of ethyl xylene in ethyl xylene-dimethyl styrene fraction_____ 1.4

*Example 5*

Example 1 is repeated in substantially all respects, but a catalyst having about 140 parts of kaolin coated onto 2710 parts of corundum is employed. In this case, the calculated thickness of the coating is 0.05 mm. The following results are obtained:

Per cent of theoretical yield of m-xylene__ 93.8
Per cent of theoretical yield of 2,4-dimethyl styrene _____ 91.2
Per cent of ethyl xylene in ethyl xylene-dimethyl styrene fraction_____ 1.6

Due to the fact that the boiling points of the ethyl xylenes are only about 4° C. to 7° C. below that of the corresponding dimethyl styrenes an efficient fractionating column is required to effect complete separation with the production of a minimum amount of intermediate fraction. The length of this intermediate and the time required to remove it are also obviously dependent on the amount of ethyl xylene existing with the xylene and dimethyl styrene in the products of decomposition.

The large reduction in the amount of ethyl xylene produced by the use of a coated catalyst therefore materially reduces the time to which the dimethyl styrene is subjected to the elevated temperatures used in fractionation whereby losses of product through polymerization are also reduced. When larger amounts of ethyl xylene are present, the loss in yield of dimethyl styrene is far larger than would be expected because of the large increased amount of polymerization due to the increased time involved in fractionation. These aforementioned improvements are manifest in the increased percentage of the theoretical yield of dimethyl styrene as presented in the foregoing examples so that the yield of the dimethyl is brought sufficiently close to that of the m-xylene that the difference is due only to unavoidable losses.

The process in general is carried out in the same manner as described in the patent of Sturrock and Lawe, No. 2,373,982.

Thus, hydrated siliceous catalysts, including the hydrated aluminum silicate, may be used in our process. The aluminum silicates are particularly effective, and especially those which have relatively high ratios of silica to alumina. However, other catalysts may be used, such as those described in our application Serial No. 611,910, filed August 21, 1945, now Patent 2,422,318, and in applications Serial Nos. 611,923-28, inclusive, now Patents Nos. 2,422,166; 2,422,169; 2,450,334; 2,422,163; 2,422,164; 2,422,165, respectively, and application Serial No. 611,919, now Patent No. 2,422,171, all filed August 21, 1945. The present application is a continuation-in-part of our application Serial No. 611,910, now Patent No. 2,422,318.

As pointed out heretofore the carrier may be granular in which case the size of the granules may vary from about 2 mm., the largest diameter of the granule, up to 5 mm. or more. The granules may be cubicle, spherical or of an irregular shape. Otherwise, the carrier may be in the form of rings, cylinders, saddles, helices, grids, etc.

It is preferable that the carrier be relatively non-porous so that the catalyst particles will be on the exterior surface of the carrier, and not impregnated therein. Accordingly, it has been found that carriers, such as Carborundum and corundum, are especially suitable. However, any relatively inert material, which is stable at the reaction temperature, i. e. at temperatures above 350° C., may be used.

The reaction temperature may be varied from about 350° C. up to 600° C., or even higher, in some cases.

It is preferable that the contact time be between about 0.004 second and 0.4 second, and very good results are obtained when this contact time is between about 0.04 second and 0.1 second.

As pointed out in the aforementioned patent, No. 2,373,982, any material which is volatile, and which does not react with the diaryl ethane may be used as a diluent, provided, also, that it does not react with the products formed by decomposition of the diaryl ethane. The molal ratio of the diluent to the diaryl hydrocarbon in the feed may be varied widely, i. e., from as low as 1:2 to 100:1, or even higher. Generally, it has been found that the optimum range is between about 5:1 and 25:1.

The calculation of the contact time of the vapor with the catalyst is a relatively complex matter, and in order to simplify this calculation we have used the term "contact time" herein to mean those values which are computed on the assumption that the catalyst contains 50% voids and neglecting both the pressure drop through the catalyst and the increase in volume which occurs during the reaction.

We prefer to employ the shortest possible contact time consistent with a substantial conversion of the diaryl ethane to a relatively pure vinyl aromatic compound together with a similar proportion of an aromatic compound containing no vinyl group. We have found that it is frequently desirable to convert only a few percent of the diaryl ethane fed to the catalyst in one pass but by recirculating the unconverted diaryl ethane from one to five times or more, a high yield is obtained very economically.

One of the advantages of employing a short contact time with the catalyst of the reacting material is that the life of the catalyst is prolonged almost indefinitely. With contact times of the order of 1 second or more the catalyst becomes fouled in a relatively short period of time due to the deposition of carbonaceous materials on the surface of the catalyst. When it is necessary or desirable to reactivate the catalyst this may be done by passing heated air, preferably mixed with steam, through the catalyst. The temperature of the air and steam mixture should be raised to about 590-650° C. The air enables the carbon to burn, whereas the steam which is used in conjunction with the air keeps the temperature from rising too high, which might cause a reduction in the activity of the catalyst. Generally at temperatures of about 590° the carbon begins to burn off and the heat of this reaction causes the temperature to rise to about 650°, say, without the application of any external heat. The coated catalyst results in the deposition of much less carbon and its active life is therefore much longer. Accordingly the time of reactivation is shortened. Therefore, the useful part of the catalyst cycle is increased in two ways, i. e., by increasing the time of its active life and by decreasing the time required for its reactivation.

It may be seen that the proximity of the reactivation temperature to the reaction temperature greatly simplifies the change from normal operation to reactivation and back to normal operation. Since the normal highly active life of the catalyst greatly exceeds the time required for its reactivation in this manner, the operation of two or more converters in parallel is readily accomplished. The short time of reactivation enables one to keep one or more converters in normal operation while one or more other converters are being reactivated.

Our process may be operated at elevated or reduced pressure, and under some conditions it is particularly advantageous to operate under reduced pressure. If the diaryl ethane which is to be decomposed is not readily volatile at ordinary pressure, reduced pressures may be used thereby facilitating the operation of our process.

The following are illustrative of the aliphatic compounds having two aryl substituents attached to the same carbon atom thereof which may be converted into the mononuclear aromatic compounds in accordance with the present invention: 1,1-diphenyl ethane, each of the 1-phenyl-1-tolyl ethanes, each of the 1,1-ditolyl ethanes, each of the 1-phenyl-1-xylyl ethanes, each of the 1-tolyl-1-xylyl ethanes, each of the 1,1-dixylyl ethanes, 1,1-diphenyl propane, each of the 1-phenyl-1-tolyl propanes, each of the 1,1-ditolyl propanes, each of the 1-tolyl-1-xylyl propanes, each of the 2,2-ditolyl propanes, each of the 1,1-di-(monochlorophenyl) ethanes, each of the 1,1-di-(dichlorophenyl) ethanes, each of the 1,1-di-(monohydroxy phenyl) ethanes, each of the 1,1-dicresyl ethanes, each of the 2,2-di-cresyl propanes, each of the 1,1-di-naphthyl ethanes, each of the 1,1-dixenyl ethanes, each of the 1-tolyl-1-naphthyl ethanes, and the like and their nuclear substituted halogen, hydroxyl and other derivatives all of which are volatile at the temperature and pressure used in the process. Those substances containing tolyl, xylyl, cresyl, xenyl, monochlorophenyl and dichlorophenyl groups may be attached to the carbon atom of the paraffin chain at the ortho, meta or para positions and when two of these groups are present they may be attached in the same or different positions.

We claim:

1. In a method of producing mononuclear aromatic compounds, the step which comprises contacting a substance of the class consisting of paraffins having at least two carbon atoms in the paraffin chain and having two aryl substituents attached to the same carbon atom of the paraffin chain with a hydrated aluminum silicate catalyst in the form of particles which will pass through an 80 mesh screen and which are in the form of a coating on a substantially non-porous carrier, at a temperature of at least 350° C.

2. A process as in claim 1, wherein the contact time is between about 0.004 second and 0.4 second.

3. A process as in claim 1, wherein the contact time is between about 0.004 second and 0.4 second, and wherein the carrier is granular.

4. A process as in claim 1, wherein the contact time is between about 0.004 second and 0.4 second, wherein the carrier is granular and wherein the coating has, as calculated, an average thickness no greater than three layers of said particles.

5. A process as in claim 1 wherein the carrier is substantially completely covered, wherein the coating is less than 1 mm. in thickness and wherein the contact time is about 0.004 second–0.4 second.

6. A process which comprises contacting an asymmetric diaryl-ethane at a temperature of at least 350° C., with a siliceous catalyst which promotes simple molecular decomposition, said catalyst being in the form of particles applied as a coating on a relatively non-porous carrier and having a thickness of less than 1 mm.

7. A process as in claim 6 wherein the carrier is substantially completely covered with particles of said catalyst and wherein the particles will pass through an 80 mesh screen.

8. A process as in claim 6 wherein the carrier is substantially completely covered with particles of said catalyst of such size that they will pass through an 80 mesh screen and wherein the carrier is covered by a calculated average of not more than three layers of particles.

MURRAY G. STURROCK.
THOMAS LAWE.

REFERENCES CITED

The following references are of record in the file of this patent:

UNITED STATES PATENTS

| Number | Name | Date |
|---|---|---|
| 2,280,649 | Kanhofer | Apr. 21, 1942 |
| 2,339,302 | Thomas et al. | Jan. 18, 1944 |
| 2,373,982 | Sturrock et al. | Apr. 17, 1945 |
| 2,422,165 | Dixon | June 10, 1947 |